Oct. 26, 1948.   H. W. LEVERENZ   2,452,523
LUMINESCENT SCREEN
Filed Oct. 31, 1941

INVENTOR
Humboldt W. Leverenz
BY
Charles McClair
ATTORNEY

Patented Oct. 26, 1948

2,452,523

UNITED STATES PATENT OFFICE 2,452,523

LUMINESCENT SCREEN

Humboldt W. Leverenz, South Orange, N. J., assignor to Radio Corporation of America, a corporation of Delaware Application October 31, 1941, Serial No. 417,269

4 Claims. (Cl. 250—80)

My invention relates to luminescent screens and particularly to luminescent screens comprising two or more layers of phosphor materials.

It is known that various phosphors when subjected to incident corpuscular radiation such as cathode rays are excited and liberate light in the visible spectrum. For many applications it is desirable to provide phosphors having a high light output in a spectral range corresponding to that of the human eye, with its maximum output frequency corresponding to the frequency at which the eye is most sensitive. However, in such phosphors only a portion of the available energy in cathode rays is utilized in liberating visible light because the wavelength energy of such rays after interception by a phosphor extends over a very broad band and only part of the energy over a portion of this band is effective in exciting the phosphor to luminescence in the desired visible range. Other phosphors, while being capable of absorbing energy more efficiently or of absorbing energy from a broader portion of the band of incident cathode ray energy, are very inefficient in converting this energy into visible light, substantially all of the light being of relatively short wavelength in the violet or ultraviolet spectral region.

It is an object of my invention to provide a phosphor screen of high excitation efficiency in the visible spectrum. It is another object to increase the intensity of visible light emitting phosphors beyond that previously obtainable with a single source of excitation incident upon a visible light emitting phosphor. A further object is to provide a source of high intensity visible light having a wavelength corresponding to that at which the human eye is most sensitive.

In accordance with my invention I provide a luminescent screen including a plurality of individual phosphor material layers and I so choose the materials and arrange the layers that the material initially excited by the incident energy transmits its excited energy to the material excitable in the visible spectrum with a minimum of loss, whereby the latter material is excited to a greater degree than had it been excited by an equivalent amount of the incident energy. More particularly, the phosphor material or layer emitting light of longer or visible wavelengths absorbs more energy from the material or layer emitting light of shorter wavelengths than would be absorbed were the exciting energy directly incident upon the layer emitting the visible light.

Figure 1:
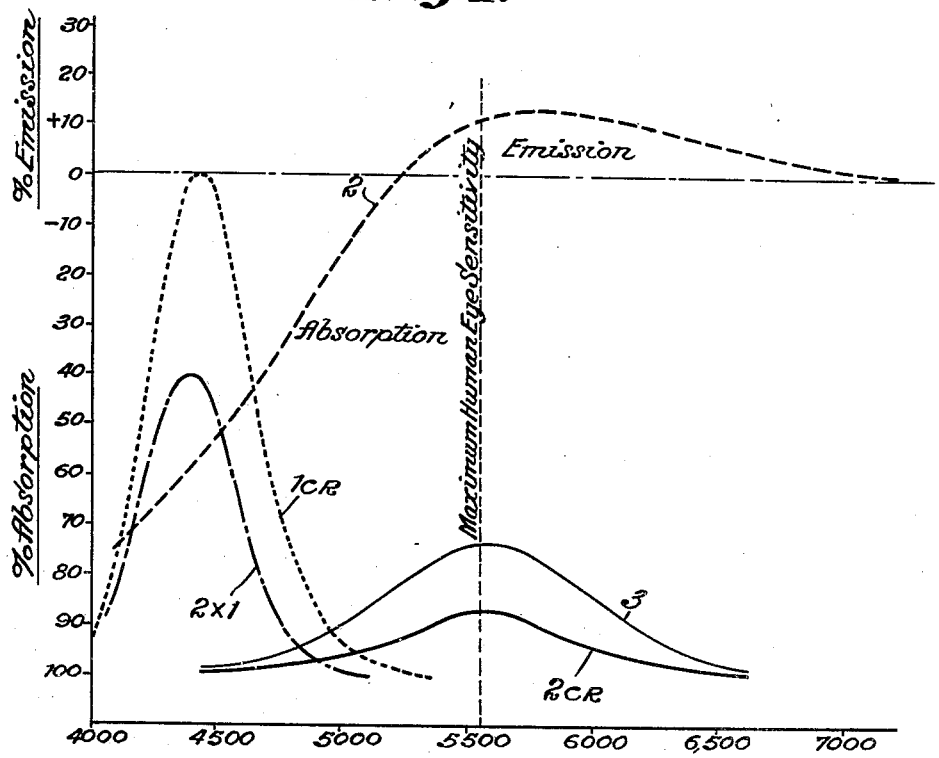
Figure 2:
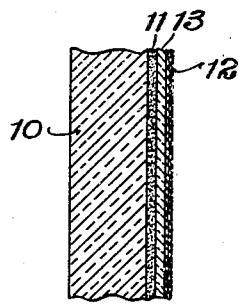

These and other objects, features and advantages of my invention will become apparent to those skilled in the art upon consideration of the following description and the accompanying drawing wherein, Fig. 1 shows representative spectral emission and absorption characteristic curves of two phosphors suitable for practicing my invention and, Fig. 2 shows a phosphor screen made in accordance with my invention.

While it is believed that the terms "luminescence," "fluorescence" and "phosphorescence" are well known in the art relating to the preparation and use of luminescent materials, I refer to luminescence as any emission of light whether in the visible or invisible portions of the spectrum, other than incandescence, produced by excitation of a phosphor material such as by radiant or corpuscular energy. I use the term fluorescence when referring to the luminescence emitted by a phosphor during excitation, whereas the term phosphorescence applies to the luminescence emitted by the phosphor after excitation. It is thus obvious that luminescence comprises two components, one a fluorescent component and the other a phosphorescent component, each of these components being displaced in time since the time of excitation is occupied by fluorescence and the time after excitation is occupied by phosphorescence.

Referring to the drawing, the dotted curve $1_{CR}$ shows the spectral emission of a silver activated zinc sulphide phosphor with wavelength in angstrom units plotted as abscissae and relative light output as ordinates under cathode ray excitation. It will be noted that the spectral emission band extends from below 4,000 angstroms to approximately 5,500 angstroms, which is below the maximum sensitivity point of the human eye. I will refer to the phosphor having such a characteristic as the first phosphor or phosphor layer. The curve $2_{CR}$ is a similarly plotted spectral emission characteristic under cathode ray excitation of a copper activated zinc-cadmium sulphide, which I will refer to as the second phosphor or phosphor layer. It is likewise noted, as shown by the curve $2_{CR}$, that its maximum emission ordinate lies substantially at the point of maximum sensitivity of the human eye. The principal object of my invention is to increase the light liberated by a phosphor of the type of which the curve $2_{CR}$ is representative in the region of the maximum sensitivity point of the human eye. Also referring to the drawing, I have shown the curve 2 as representative of the spectral absorption of the second phophor material of which the curve $2_{CR}$ is representative of the emission when excited by cathode rays. Each of the curves 1cr and 2cr is drawn to scale and is representative of the relative outputs of the two phosphors under equal cathode ray excitation. Since these curves are drawn to scale and the curve 2 is the spectral absorption characteristic of the second phosphor, the area under the curve designated 2x1, which is the product of the curve 2cr and the curve 2, is representative of the energy absorbed by the second phosphor material. Wherever I have used the term "absorption" I mean that the light liberated by the phosphor having the shorter wavelength emission spectra is efficiently absorbed by the phosphor having the longer wavelength emission spectra in the sense that the principal portion of the absorbed radiation is converted into luminescence in the longer wavelength spectral region. Assuming that the radiant energy absorbed by the second phosphor (the curve 2x1) from the first phosphor is converted in its entirety, except for the quantum deficit, into energy radiated in the band of the characteristic curve 2cr, the efficiency of this process is greater than the efficiency of the single stage excitation process involving the excitation of the second phosphor directly with an equivalent cathode ray excitation and the resultant intensity in the visible band of curve 2cr is shown by the curve 3.

The relationship between the emission characteristic of the first phosphor material and the absorption characteristic of the second phosphor may be clarified by the following analysis: Assume that a material A (the first phosphor) is excited by some form of exciting energy such as cathode rays and that A in turn excites B (the second phosphor). A must necessarily have an emission spectra which on the whole is composed of shorter wavelength light than B. For purposes of comparison, assume that A under cathode ray excitation emits 100 energy units (assumed equal to 100% energy efficiency) over its entire spectral band but of the 100 energy units only 20 stimulate the human eye in the visible portion of the spectrum. Such a phosphor may be said to have visual efficiency of 20%. On the other hand, assume that B under equivalent cathode ray excitation emits 20 energy units over its spectrum with 10 units of visible utility. The visual efficiency of phosphor B would then be 10%. However, it is desired to obtain a visible energy unit emission from B in excess of the 10 units produced by cathode ray excitation. Thus the spectral emission and absorption characteristics of A must be chosen with respect to B such that the visible energy emission is greater than 10 units. Consequently, the efficiency of B may be increased by 100% with respect to its original if the materials are so chosen that 40 energy units are liberated when the material B is excited by the emission spectrum of material A. Thus the amount of energy absorbed from A by B (2x1) should be greater than the amount of energy emitted by B, under identical cathode ray excitation, to obtain a characteristic such as curve 3 which lies above the curve 2cr. In order to obtain this greater amount of energy emitted from B, I provide the material B with respect to its characteristics such that the peak of its absorption band is located at a longer wavelength than the emission band of A, with the two bands over-lapping to yield the necessary condition that the product of the A emission band and B absorption band is greater than the emission from B.

In order to obtain the highest efficiency from my system of phosphor layers and further in accordance with my invention, I excite the first phosphor layer and further choose the material of this layer transparent to its emission spectrum. I therefore provide the phosphor material for the first layer of a crystal size and shape so as to be conducive to high optical transparency to light of a frequency in the emission band of the first phosphor. For example, the maximum efficiency is realized when very large crystals of the first phosphor are used, preferably large flat single crystal plates forming the first layer and lying with the major area exposed to the incident exciting energy. The second phosphor material is then chosen to be highly absorbing to the light emitted by the first phosphor. Preferably the second phosphor is of a crystal size and shape such that the light is diffused so that it may be absorbed more readily. Preferably the crystals of the second phosphor layer are small in comparison to the crystals of the first phosphor layer. Thus the material of the second phosphor may be finely divided, having a crystal size of predominantly 5 microns, whereas the first phosphor is of material averaging 10 microns or larger and if in the preferable form as large flat single crystal plates, the ratio of area to thickness of the crystal plates may be 3 to 1 or greater such as a ratio of 5 to 1, the thickness averaging 5 microns.

Referring to Fig. 2, the two phosphor layers may be applied to a foundation preferably of transparent material such as glass, the method of application being such that the second phosphor layer for a system excitable by cathode ray energy is deposited first and in contact with the support. Thus a support member 10 of glass or other suitable material may be provided, to one surface of which is applied the phosphor layer 11, referred to above as the second layer, preferably in the form of small individual light absorbing and light diffusing crystals. The first layer 12 is then applied either directly to the previously applied layer 11 or to an intermediate optical bonding medium 13 between the two layers. It is desirable to provide as good optical contact between the two layers as possible and for this reason a material forming the bonding medium 13 may be applied to the second layer 11 followed by immediate application of the first layer 12 while the bonding medium material is in a fluid or viscous state. Materials such as boron oxide, alkali silicates or germanates are suitable for use as optical bonding media. Preferably the index of refraction of the bonding media should be approximately equal to the square root of the product of the indices of refraction of the two phosphors being bonded.

While a several fold gain in light output in the region of maximum sensitivity of the human eye may be obtained when excitation is by cathode ray energy, even greater efficiencies may be obtained where the excitation is by short wavelength ultra-violet light. Thus some phosphors which otherwise would be inefficiently excited or even unexcited by the primary excitation may be used in accordance with my concept to give highly visible luminescence. For example, copper activated zinc sulphide is not appreciably excited by radiation in the region near 2200 angstroms but may be excited to give high luminescence by the emission of calcium tungstate when the tungstate is excited by ultraviolet at 2200 angstroms.

To achieve maximum efficiency from my multilayer screens, it is essential that each phosphor be synthesized and constituted in such a manner that it makes the best use of the exciting energy incident upon it. For example, if a two-layer screen is desired and the first layer is to be excited by cathode rays and the second layer excited by emission from the first layer, then the first layer should show maximum efficiency under cathode rays, irrespective of its efficiency under X-rays, ultraviolet, etc.; while the second layer should show maximum efficiency under the emission from the first layer, irrespective of its efficiency under cathode rays, alpha particles, X-rays or other exciting energy.

As an example of the difference in preparation required to achieve maximum efficiency under different types of excitation, a 40% zinc sulphide-60% cadmium sulphide phosphor activated by 0.01% silver may be considered with respect to variation in relative efficiency when crystallized at different temperatures.

| Firing Temperature and Time | Relative Efficiency | | |
|---|---|---|---|
| | Cathode ray | 3650° A. | 2537° A. |
| 880°—90 minutes | 13 | 14 | 17 |
| 940°—120 minutes | 11.5 | 15 | 12 |

It should be noted that the lower firing temperature and time provide a material which is more efficient under cathode ray and 2537 angstroms than that produced by the higher firing temperature and time, whereas the latter material is more efficient at 3650 angstroms.

While I have described my invention particularly with respect to phosphors excitable by cathode ray energy, it will be apparent that other forms of radiant or corpuscular energy excitation such as referred to above may be used as long as the materials comprising the two layers are selected in accordance with my inventive concept. Furthermore, while I have described my invention only with respect to a dual phosphor layer combination, the principles underlying my new and improved operation nevertheless apply with equal force to multi-layer luminescent screens having more than two layers wherein the spectral emission and absorption characteristics are progressively displaced and overlap in the manner described above. Therefore while I have described completely only one particular modification of my invention, it is nevertheless susceptible of further modifications and embodiments without departing from the scope of the appended claims.

I claim:

1. A luminescent screen comprising two phosphor layers, the material of one layer having an emission spectrum in the violet portion of the spectrum and being of relatively large average particle size to render said layer highly light transmitting, the other phosphor layer being of material having an absorption spectrum corresponding to the emission spectra of said one layer, an emission spectra of longer wavelength than that of said one layer and of an average particle size smaller than that of the said one layer.

2. A luminescent screen comprising two phosphor layers and an optical bonding medium between said layers, said two layers being of phosphors having different emission spectra, one of said layers being of flat single crystal phosphor plates, the other layer being of small particle size, the phosphor of flat single crystal plates having the shorter wavelength emission spectrum and the layer of smaller particle size material having an absorption spectrum overlapping the emission spectrum of the material of larger particle size.

3. A screen as claimed in claim 2 wherein the index of refraction of said bonding medium is substantially equal to the square root of the product of the indices of refraction of said phosphors.

4. A luminescent screen comprising a first layer of substantially transparent phosphor material formed as flat single crystal plates, and a second phosphor layer closely adjacent said first layer of light diffusing light absorbing small particle size material, the material of said first layer having a shorter wavelength emission spectrum than that of the second layer, the second layer having an absorption spectrum overlapping the emission spectrum of said first layer material.

HUMBOLDT W. LEVERENZ.

REFERENCES CITED

The following references are of record in the file of this patent:

UNITED STATES PATENTS

| Number | Name | Date |
|---|---|---|
| 2,144,040 | Wurstlin | Jan. 17, 1939 |
| 2,150,966 | Eggert | Mar. 21, 1939 |
| 2,177,691 | Dawihl | Oct. 31, 1939 |
| 2,227,070 | De Boer | Dec. 31, 1940 |
| 2,243,828 | Leverenz | May 27, 1941 |
| 2,303,563 | Law | Dec. 1, 1942 |

FOREIGN PATENTS

| Number | Country | Date |
|---|---|---|
| 474,907 | Great Britain | Nov. 9, 1937 |
| 490,029 | Great Britain | Aug. 4, 1938 |

OTHER REFERENCES

Nichols, Howes and Wilber, "Cathode-Luminescence," page 106, published by Carnegie Institute of Washington, 1928. (Copy in Div. 54.)